United States Patent
Mishra et al.

(10) Patent No.: US 8,085,719 B2
(45) Date of Patent: Dec. 27, 2011

(54) SYSTEM AND METHOD FOR ACHIEVING WIRELESS COMMUNICATIONS WITH ENHANCED USAGE OF SPECTRUM THROUGH EFFICIENT USE OF OVERLAPPING CHANNELS

(76) Inventors: Arunesh Mishra, Madison, WI (US); Suman Banerjee, Madison, WI (US); Vivek V. Shrivastava, Madison, WI (US)

( * ) Notice: Subject to any disclaimer, the term of this patent is extended or adjusted under 35 U.S.C. 154(b) by 819 days.

(21) Appl. No.: 11/767,131

(22) Filed: Jun. 22, 2007

(65) Prior Publication Data

US 2007/0298721 A1  Dec. 27, 2007

Related U.S. Application Data

(60) Provisional application No. 60/816,020, filed on Jun. 23, 2006.

(51) Int. Cl.
*H04W 4/00* (2009.01)

(52) U.S. Cl. ............ 370/329; 455/114.2; 455/63.1; 455/278.1; 455/443; 455/450; 455/451; 455/452.1

(58) Field of Classification Search .......... 370/63.1, 370/114.2, 278.1; 455/63.1, 443, 114.2, 455/278.1, 450–452.1

See application file for complete search history.

(56) References Cited

U.S. PATENT DOCUMENTS

| 7,072,999 | B1 * | 7/2006 | DesJardins et al. .......... 710/58 |
| 2002/0173272 | A1 | 11/2002 | Liang et al. |
| 2003/0097645 | A1 | 5/2003 | Kim et al. |
| 2003/0207699 | A1 | 11/2003 | Shpak |
| 2006/0025150 | A1 * | 2/2006 | Kim et al. .......... 455/453 |
| 2006/0045126 | A1 * | 3/2006 | Klahn et al. .......... 370/465 |
| 2006/0165114 | A1 * | 7/2006 | Diepstraten et al. .......... 370/445 |
| 2006/0203086 | A1 * | 9/2006 | Pavlakovic .......... 348/61 |
| 2007/0287464 | A1 * | 12/2007 | Hamamoto et al. .......... 455/447 |

FOREIGN PATENT DOCUMENTS

EP    1311087 A2    5/2003

* cited by examiner

*Primary Examiner* — Kamran Afshar
*Assistant Examiner* — Edward Zhang
(74) *Attorney, Agent, or Firm* — Boyle Fredrickson, S.C.

(57) ABSTRACT

An improved system and method for wireless communications, as well as a method for configuring wireless communication devices for use in such a system, are disclosed. In at least some embodiments, the system for wireless communications includes a first wireless communication device configured for communication within a first frequency range, and a second wireless communication device configured for communication within a second frequency range, where the first and second frequency ranges substantially but not entirely overlap one another. Also, in at least some embodiments, the present invention relates to a method that wireless communicating devices can use in order to co-exist or utilize wireless channels that need not be non-overlapping. By allowing wireless devices to do this, it is possible to achieve greater usage of the wireless spectrum and as a result superior performance of the wireless communication system as a whole.

14 Claims, 3 Drawing Sheets

SYSTEM AND METHOD FOR ACHIEVING WIRELESS COMMUNICATIONS WITH ENHANCED USAGE OF SPECTRUM THROUGH EFFICIENT USE OF OVERLAPPING CHANNELS

CROSS-REFERENCE TO RELATED APPLICATIONS

The present application claims the benefit of U.S. provisional patent application No. 60/816,020 filed Jun. 23, 2006 and entitled "SYSTEM AND METHOD FOR ACHIEVING WIRELESS COMMUNICATIONS WITH ENHANCED USAGE OF SPECTRUM THROUGH EFFICIENT USE OF OVERLAPPING CHANNELS", which is hereby incorporated by reference herein.

STATEMENT REGARDING FEDERALLY SPONSORED RESEARCH OR DEVELOPMENT

This invention was made with United States Government support awarded by the following agency: NSF under Grant #CNS-0520152.The United States Federal Government has certain rights in this invention.

FIELD OF THE INVENTION

The present invention relates to wireless communications and, more particularly, relates to methods and systems for achieving enhanced usage of the electromagnetic spectrum in achieving wireless communications.

BACKGROUND OF THE INVENTION

Wireless communication devices are ubiquitous. Among the many wireless communication devices that are now in operation are wireless communication devices that operate in accordance with one or more of the 802.11 family of protocols, for example, wireless communication devices used in wireless local-area networks (LANs), wireless mesh networks and Wi-Fi applications.

In many applications involving multiple wireless communication devices, the signals generated by the multiple wireless communication devices can interfere with one another. This is particularly the case in applications, such as applications involving LANs, wireless mesh networks and/or Wi-Fi, in which the multiple wireless communications device are in relatively close proximity of one another, for example, within a building.

Communication in accordance with the 802.11 family of protocols typically takes place in one of two different bands of the electromagnetic spectrum, namely, bands surrounding 5 GHz and 2.4 GHz. The bands in turn are divided into several channels centered at center frequencies that are approximately 5 MHz apart, where each channel occupies a band of approximately plus or minus 11 MHz about the respective center frequency of the channel, and each channel has an overall bandwidth of approximately 44 MHz. As such, adjacent or neighboring channels overlap one another to some extent.

Wireless communication devices operating in accordance with the different families of protocols, such as 802.11 and 802.16, typically are capable of selecting a specific channel for operation and then adhere to that selected channel. Conventional wireless communication devices have the capability of detecting when other wireless communication devices are operating in the same channel, and of adjusting to account for interference that can occur due to the shared usage of the same channel (e.g., through the use of a random access contention mechanism such as RTS-CTS handshakes).

As noted above, the various channels available in accordance with the 802.11 family of protocols overlap with one another to a fair degree. For example, the 802.11(b) protocol employed in applications such as Wi-Fi applications has 11 channels defined in the standard. Each given channel overlaps in its spectral width not only with neighboring channels (e.g., channel 6 tends to overlap channels 5 and 7) but also with channels that are non-neighbors (e.g., channel 6 also tends to overlap each of channels 2-5 and 7-10, albeit it does not overlap at all channels 1 or 11).

Further, while conventional wireless communication devices are generally capable of adjusting for and overcoming the effects of interference that arise from sharing a given channel among multiple wireless communication devices, conventional wireless communication devices tend to have difficulty adjusting for and overcoming interference that arises when other wireless communication devices are operating in neighboring, overlapping channels. Indeed, in many such cases, conventional wireless communication devices are unable even to detect that other wireless communication devices are operating in neighboring, overlapping channels, notwithstanding the fact that the wireless communication devices are experiencing inhibited performance due to interference from those other wireless communication devices.

Given these problems, conventional arrangements of wireless communication devices typically are set to minimize the amount of interference that can occur when multiple wireless communication devices are communicating in different channels. For example, again with respect to applications involving the 802.11(b) protocol having 11 channels, if two access points at which wireless communication devices are located are positioned nearby one another, the wireless communication devices at those access points are assigned entirely (or substantially) nonoverlapping and noninterfering channels (e.g., channels 1 and 6 or 6 and 11).

However, while this solution reduces the amount of interference, this solution is not ideal insofar as it limits the effective overall bandwidth that is available for communication among different wireless communication devices. That is, by restricting wireless communication devices to nonoverlapping and noninterfering channels, one avoids any use of the neighboring or intermediate channels (e.g., channels 2-5 and 7-10) for the communication of any information. Given that the use of wireless communication devices in a variety of applications continues to increase, and given that the amount of information being communicated among wireless communication devices also continues to increase, the decision to limit communication among devices to nonoverlapping, noninterfering channels increasingly threatens to hamper the performance of, or to dampen the development of, wireless communication systems.

For at least these reasons, therefore, it would be advantageous if an improved method and/or system for wireless communications, and/or method of making or constructing such a system, could be developed in which the use of available electromagnetic spectrum for communications by such a system was enhanced and yet, at the same time, the operation of the system was not significantly compromised by interference among the devices.

BRIEF SUMMARY OF THE INVENTION

The present inventors have recognized that it would be desirable to have an improved method and/or system for wireless communications that in at least some embodiments achieved higher usage of the available electromagnetic spectrum than conventional arrangements yet at the same time was able to avoid and/or adjust/compensate for interference to a similar (or at least acceptable) extent as in conventional arrangements. The present inventors have additionally recognized that one reason why conventional arrangements do not make as effective use of the available electromagnetic spectrum as one might desire is that conventional arrangements presuppose that, to minimize and/or compensate for interference, wireless communication devices must either use channels that do not overlap, or must share the same channels such that interference can be detected and dealt with.

The present inventors have further recognized that this assumption is not in actuality a physical requirement and that in fact, wireless communication devices could utilize multiple channels that do overlap to a more significant degree so long as the resulting interference levels created by the interplay of the signals from the different wireless communication devices were not excessive and/or could be accounted for by the devices. The present inventors have additionally developed criteria for characterizing the interference level(s) that can arise as a result of any given arrangement of wireless communication devices operating at different channels, and recognized that an improved system for wireless communications in at least some embodiments can be achieved by a method involving arranging wireless communication devices and setting the channels in which those devices operate in a manner tending to keep interference levels within acceptable bounds.

More particularly, in at least some embodiments the present invention relates to a method of configuring first and second wireless communication devices for wireless communication within first and second overlapping frequency ranges, respectively. The method includes (a) determining a first interference value that would occur if both the first and second overlapping frequency ranges were substantially identical, and (b) determining a second interference value that would occur if the first overlapping frequency range differed from second overlapping frequency range by a specified amount. The method further includes (c) determining whether an overall interference value based at least in part upon the first and second interference values satisfies a threshold criterion, and (d) if the threshold criterion is met, then configuring at least one of the first and second wireless communication devices so that the first and second overlapping frequency ranges of the first and second wireless communication devices differ by substantially the specified amount.

Additionally, in at least some embodiments the present invention relates to a wireless communication system. The system includes a first wireless communication device configured for communication within a first frequency range, and a second wireless communication device configured for communication within a second frequency range, where the first and second frequency ranges substantially but not entirely overlap one another.

Further, in at least some embodiments the present invention relates to a method of operating first and second pairs of wireless communication devices. The method includes transmitting first communication signals within a first frequency range between the wireless communication devices of the first pair, and transmitting second communication signals within a second frequency range between the wireless communication devices of the second pair, with the second frequency range substantially overlapping but not identical to the first frequency range. Interaction of the first and second communication signals produces interference, and an amount related to the interference is less than a threshold, whereby the wireless communication devices of the first pair are able to communicate with one another and the wireless communication devices of the second pair are able to communicate with one another in a manner that is substantially unimpeded by the interference.

DETAILED DESCRIPTION OF THE INVENTION

Figure 1:
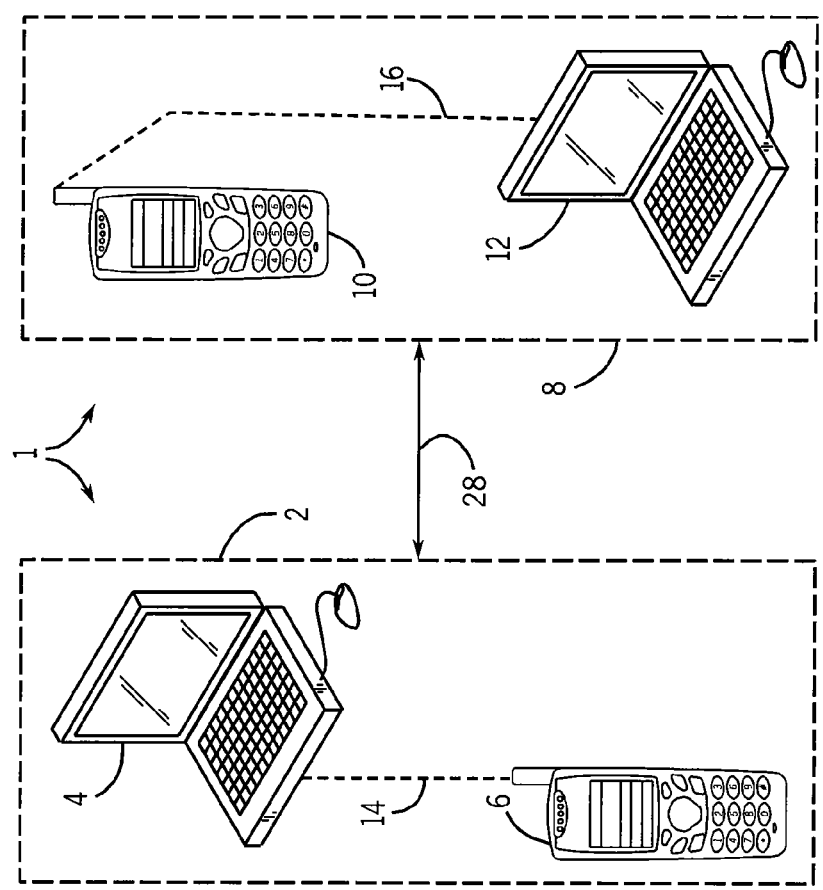
FIG. 1 shows in schematic form an exemplary set of wireless communication devices that are capable of communicating via two different channels and which may experience interference as a result thereof.

Referring to FIG. 1, embodiments of the present invention are applicable to systems and applications in which multiple wireless communication devices communicate with one another within multiple frequency ranges and/or multiple different channels. FIG. 1 shows in particular one exemplary wireless communication system 1 that includes a first pair 2 of wireless communication devices that includes first and second wireless communication devices 4 and 6, respectively, and a second pair 8 of wireless communication devices that includes third and fourth wireless communication devices 10 and 12, respectively. The devices 4 and 6 of the first pair 2 communicate with one another via a first channel (or frequency range) 14, while the devices 10 and 12 of the second pair 8 communicate with one another via a second channel (or frequency range) 16.

In the example of FIG. 1, the wireless communication devices 4 and 12 are laptop or notebook personal computers while the devices 6 and 10 are personal digital assistants (PDAs). However, FIG. 1 is intended to be generally representative of any wireless communication devices including, for example, desktop computers, handheld devices (other than PDAs), cellular telephones, and other wireless communication devices. Each of the wireless communication devices typically includes a transmitter and a receiver (or a transceiver combining both), as well as a processing/control device such as a microprocessor. The wireless communication devices 4, 6, 10 and 12 can be implemented as (or as part of) any of a variety of types of wireless systems and/or applications including, for example, wireless LANs (e.g., WLANs), wireless mesh networks (with multi-node-hopping communications), Wi-Fi or BlueTooth.

Figure 2:
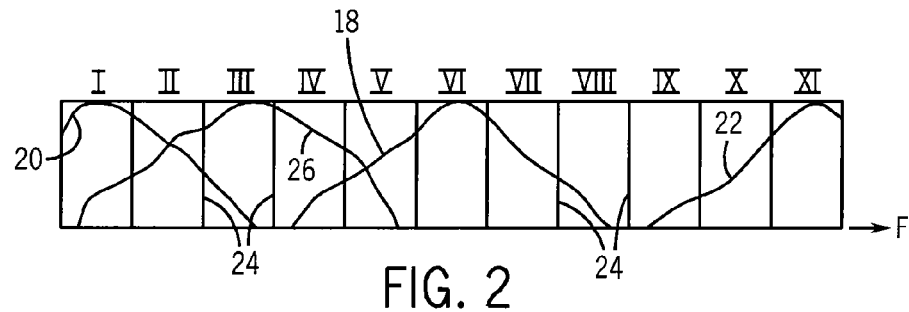
FIG. 2 shows in schematic form an exemplary set of neighboring and, in some cases, overlapping channels.

Referring additionally to FIG. 2, for the purposes of the present example, it is assumed that the wireless communication devices 4, 6, 10 and 12 are configured for communication in accordance with the 802.11(b) protocol. That is, as shown in FIG. 2, each of the wireless communication devices 4, 6, 10 and 12 is configured for communication in one of eleven different channels (numbered I to XI), where the devices of each respective pair 2 and 8 in particular communicate within a given one of the channels. FIG. 2 in particular shows, by way of demarcation lines 24, idealized frequency ranges of each of the channels I-XI. However, as illustrated by curves 18, 20, 22 and 26, the actual portions of the frequency domain within which signals are transmitted in a given channel extend beyond the demarcation lines 24 associated with that given channel and spill over into other neighboring channels.

More specifically, FIG. 2 illustrates that an actual extent of the frequency range of signals transmitted by way of the channel VI, represented by the curve 18, overlaps an actual extent of the frequency range of signals transmitted by way of the channel III, represented by the curve 26. Thus, channels VI and III overlap one another to a fair degree. At the same time, the actual extents of the frequency ranges of signals transmitted by way of the channels I and XI, represented by the curves 20 and 22, respectively, do not overlap the actual extent of the frequency range of signals transmitted by way of channel VI (represented by the curve 18), and consequently no interference would occur between two sets of devices communicating respectively on two different ones of the channels I, VI and XI.

Although in the present example the devices 4, 6, 10 and 12 are configured for operation in accordance with the 802.11(b) protocol, the present invention is intended to encompass a zvariety of other embodiments in which wireless communication devices communicate in accordance with protocols other than the 802.11 (b) protocol including, for example, other members of the 802.11 family of protocols (e.g., the 802.11a and 802.11g protocols) and other protocols, for example, the 802.16 protocols. Additionally, the present invention is not only intended to encompass embodiments in which wireless communication devices communicate within frequency ranges of the electromagnetic spectrum used by the 802.11(b) protocol, other members of the 802.11 family of protocols, and other commonly-used protocols such as the 802.16 protocols, but also is intended to encompass embodiments in which the devices communicate within other frequency ranges as well.

Further, while due to the fact that the present example relates to use of the 802.11(b) protocol, the present example presumes that the wireless communication devices 4, 6, 10 and 12 are capable of being configured for communication in any of eleven different channels. Nevertheless, the present invention is also intended to encompass embodiments in which wireless communication devices can be configured for operation in overlapping channels of any set of channels of arbitrary number, and indeed for operation in accordance with protocols or formats in which channels are not distinctly defined, but rather the wireless communication devices are potentially capable of transmitting and/or receiving signals within overlapping frequency ranges within the electromagnetic spectrum.

As described above, in conventional embodiments two pairs of wireless communication devices such as those shown in FIG. 1 would typically be configured so that either both of the channels 14, 16 were the same, or that the channels 14, 16 were substantially nonoverlapping and noninterfering channels. Thus as shown in FIG. 2, the wireless communication devices 4, 6 of the first pair 2 could be configured to communicate by way of channel VI, while the wireless communication devices 10, 12 of the second pair 8 could be configured to communicate by way of either channel VI (e.g., such that both pairs shared the same channel) or to communicate by way of either channel I or channel XI.

In contrast to conventional embodiments, and in accordance with embodiments of the present invention, it is also possible for the first and second pairs 2, 8 of wireless communication devices to communicate by way of channels (or frequency ranges) that overlap to some degree even though the channels are not the same. For example, with reference to FIG. 2, it is possible that the wireless communication devices 4, 6 of the first pair 2 could be configured to communicate by way of channel VI while the wireless communication devices 10, 12 of the second pair 8 could be configured to communicate by way of the channel III. As a result of communicating in such overlapping (but non-identical) channels, as shown in FIG. 1, interference 28 between the pairs 2, 8 of wireless communication devices results. While the existence of such interference 28 would in conventional embodiments be understood as rendering the wireless communication devices inoperable (or at least highly inefficient), embodiments of the present invention allow a wireless communication system to operate in many cases notwithstanding the presence of such interference.

Figure 3:
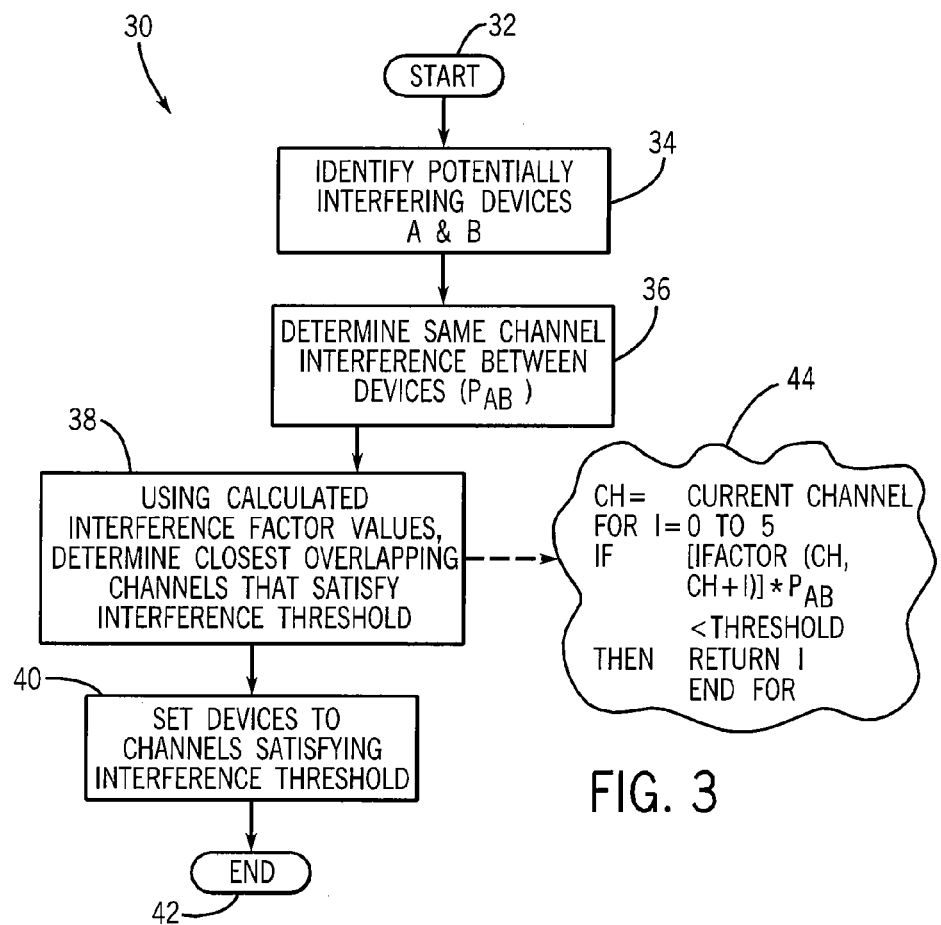
FIG. 3 is a flow chart showing exemplary steps of a process for determining appropriate overlapping channels that can be used for communication among wireless communication devices such as those of FIG. 1.

In accordance with at least some embodiments of the present invention, to achieve a wireless communication system in which communication among devices can occur on two (or possibly more) overlapping channels, a process represented by a flow chart 30 shown in FIG. 3 is performed. The present invention does not envision that effective communications between wireless communication devices can be always achieved for any arbitrary set of wireless communication devices that are communicating by way of any arbitrary set of overlapping channels. Rather, the present invention envisions that it is possible to achieve effective communications among many sets of wireless communication devices communicating by way of different channels (or frequency ranges) that to some degree overlap, and the process of FIG. 3 is a process that, if followed, allows for determinations to be made as to which such arrangements and configurations of wireless communication devices are suitable for achieving effective communications.

Thus, referring to FIG. 3, upon starting the process at a step 32, one identifies two wireless communication devices (e.g., devices A and B) that are potentially capable of communications in two different channels. The devices could be, for example, one of the devices of the first pair 2 and one of the devices of the second pair 8 of FIG. 1 or, also for example, could be two access points of a WLAN. Next, at a step 36, a same channel interference between the devices, $P_{AB}$ is determined.

The same channel interference $P_{AB}$ is intended to be representative of the interference that would occur between the two devices if the two devices were operating on the same channel (e.g., operating within frequency ranges that identically, or nearly-identically, overlapped one another). The same channel interference provides an indication, among other things, of the degree of interference that exists due to physical factors such as the physical distance between the two devices. Although theoretical models (e.g., radio signal propagation models) can be used to determine the same channel interference, this interference can also be determined empirically and, in fact, often is done so today in conventional wireless communication systems in which multiple devices are communicating within the same channel.

Upon determining the same channel interference at step 36, then at a step 38 a routine is performed to determine a closest pair of overlapping channels that still would allow for effective or acceptable communications by the two devices (e.g., communications by those devices with other devices by way of the two overlapping channels, respectively). Although the routine of step 38 can take a variety of forms, one exemplary routine 44 that could be employed as step 38 is expressed in pseudocode in FIG. 3. As shown in the routine 44, performance of the routine utilizes not only the same channel interference $P_{AB}$ value determined in step 36, but also involves the calculation of interference factors (which also can be termed "IFACTORs"). An interference factor is a function that takes as its arguments two frequency bands (or channels) corresponding to the two communicating devices under question (potentially using different wireless communication methods). For a given assignment of the frequency bands to the two communicating devices, the value of the interference factor function represents the amount of overlap between the transmission frequency (or frequency band, e.g., channel) of one device and the reception frequency (or frequency band, e.g., channel) of another device. Overall, as a function, the interference factor is representative of the interference associated with different possible combinations of overlapping frequency bands (or channels) being used by the two devices.

As shown more particularly by Equation (1), an interference factor $IF_{(T,R)}(\tau)$ capturing an amount of overlap can be determined quantitatively by calculating an area of intersection between a transmitted signal's spectrum and a receiver's band-pass filter. With $F_T$ being a center frequency of a transmission frequency band or channel, $F_R$ being a center frequency of a reception frequency band or channel, $\tau$ being the difference between those two center frequencies, $S_T(f)$ being the transmitted signal's power distribution across the frequency spectrum, and $B_R(f)$ being the frequency response of the band-pass filter of the receiving device, the interference factor $I_{F(T,R)}(\tau)$ concerning a transmitting device operating at the transmission frequency band and a receiving device operating at the reception frequency band can be calculated as follows:

$$IF_{(T,R)}(\tau) = \int_{-\infty}^{+\infty} S_T(F) B_R(F - \tau) df \quad (1)$$

Equation (1) allows for calculation of interference factors where the difference in center frequencies r can take any arbitrary amount within a continuous range of values. For circumstances where the wireless communication devices are intended to communicate in accordance with a particular format or protocol, certain simplifying assumptions can often be made resulting in a discrete version of the interference factor calculation. For example, if the wireless communication devices as discussed above are intended to operate in accordance with the 802.11(b) protocol (e.g., within any one of eleven particular channels), then the center frequencies of neighboring channels are spaced apart by 5 MHz. Consequently, $\tau$ for any given pair of different channel numbers is equal to 5 |i-j|, where i and j are the channel numbers (e.g., if channels III and VI were proposed to be used, then $\tau$ would be 15 MHz).

Figure 4:
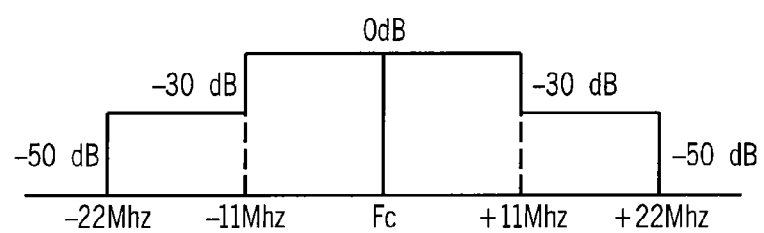
FIG. 4 is a graph showing an exemplary transmit spectrum mask applicable for communication by way of the 802.1 (b) protocol.

In at least some embodiments, the success of the present invention in terms of allowing wireless communication devices to communicate within overlapping, but not identical, frequency ranges stems at least in part from the fact that conventional wireless communication devices have imperfect transmit masks such that such devices fail to fully utilize the spectra associated with the particular channels assigned to those devices. For example, where use of the 802.11(b) protocol is presumed, one can assume that the power distribution for the transmitted signal (transmitted by one of the devices) substantially takes the form of a transmit spectrum mask as shown in FIG. 4. Additionally, since it is advantageous for a wireless card designer to use the same filter for transmitting a signal and band-limiting the reception, one can also assume that the receiving device's band-pass filter will have the same transmission characteristic as the transmit spectrum mask.

Given these assumptions, one can employ the following values into Equation (1) in calculating an interference factor, where $F_c$ is the channel center frequency:

$$B_R(f) = S_T(f) = \begin{cases} -50 \text{ dB} & \text{if} |f - F_c| > 22 \text{ MHz} \\ -30 \text{ dB} & \text{if } 11 \text{ MHz} < |f - F_c| \leq 22 \text{ MHz} \\ 0 \text{ dB} & \text{Otherwise} \end{cases} \quad (2)$$

Referring again to FIG. 3, in accordance with step 38, multiple frequency range/channel combinations are potentially (and typically) considered in determining whether the overall interference encompassing both same channel interference ($P_{AB}$) and overlapping channel interference ($IF_{(T,R)}(\tau)$) exceeds or falls below a desired threshold. Typically, the closer that two frequency ranges/channels are, the higher their overlapping channel interference. At the same time, it is desirable to be able to accommodate overlapping frequency ranges/channels that are as close together as possible, so as to enhance the overall usage of all of the possible frequency ranges/channels, e.g., to enhance the overall usage of the entire available portion of the electromagnetic spectrum. Thus, the routine performed in step 38 typically considers a series of different combinations of frequency ranges/channels, starting with frequency ranges/channels that are closer together and proceeding to frequency ranges/channels that are farther apart, and continues until a pair of frequency ranges/channels satisfies the interference threshold (which can also be considered a noise threshold).

The exemplary routine 44 shown in FIG. 3 is representative of a variety of routines that can be employed to determine a closest pair of frequency ranges/channels that are compatible with acceptable communications performance, and that operate by comparing the product of a same channel interference value and an overlapping channel interference value with a threshold interference value. Yet the exemplary routine 44 is also in particular suited for use in determining the channels for two devices that are intended for communications in accordance with the 802.11(b) protocol.

More particularly, as discussed above, two channels in accordance with the 802.11(b) protocol will overlap one another unless the two channels are five or more channels apart from one another. Thus, for any given device intended for operation on one of the eleven channels of the 802.11(b) protocol, there are six different possible levels of interference that could be experienced from a second device depending upon whether that second device is operating on the same channel, an adjacent channel, or channels two, three, four, or five channels away from the channel of the given device.

The routine 44 of FIG. 3 thus is configured to loop through up to six different calculations of interference factors and six different comparisons of those interference factors with a desired threshold, beginning with the interference factor existing when both of the devices are operating on the same channel (albeit this iteration in some embodiments could be skipped), and continuing with interference factors existing when the devices are operating on channels that are increasingly far apart, until the channels are so far apart (e.g., five channels apart) that they are no longer overlapping. As soon as a particular iteration of the loop arrives at an interference factor resulting in the threshold criterion being met, then the routine is complete and the channel separation associated with that interference factor is returned.

Once the performance of step 38 identifies the closest overlapping pair of channels (or other frequency ranges) that satisfies the interference threshold, then step 40 is performed.

In this step, the two devices are set to two different channels having the channel separation identified in step 38. If a channel selection has already been mandated or otherwise determined for one of the devices, then the channel selection for the second device can be automatically determined (or, in some circumstances, two possible candidates for the channel of the second device are readily identifiable). For example, if the channel separation identified in step 38 is three channels, and the first device is already set to channel VI, then the second device should be set to either channel III or channel IX.

The setting of channels performed in step 40 can be automatically performed, e.g., under the control of one or more processing devices (e.g., a microprocessor) associated with the wireless communication devices or system, or in some circumstances can be manually determined. Also, in some cases, wireless communication devices or systems are manufactured with their channel settings preset. Indeed, from the above discussion in should be noted that, in at least some embodiments, the interference factors for a given device are determined solely by the radio characteristics of the communicating or interfering entities, and this determination does not depend on the environment of use. Thus, computing the interference factor values once can be sufficient for the lifetime of the given device (and this can greatly improve/speed up the method used to determine the interference values). Finally, regardless of whether the interference factor values and/or channel settings are determined once or repeatedly, once the channel setting step 40 is performed in any given performance of the routine of FIG. 3, then the routine is ended at a step 42.

Although the routine performed in step 38 as described above considers different frequency range/channel possibilities in an order ranging from where the frequency ranges/channels are closer together to where they are farther apart, in alternate embodiments the various possibilities could be considered in any order. Further, while the above description largely focuses upon embodiments in which wireless communication devices are configured for communication within two different overlapping frequency ranges/channels, the present invention is also intended to encompass embodiments in which numerous wireless communication devices are configured for communication within three or more different overlapping frequency ranges/channels.

It is specifically intended that the present invention not be limited to the embodiments and illustrations contained herein, but include modified forms of those embodiments including portions of the embodiments and combinations of elements of different embodiments as come within the scope of the following claims.

We claim:

1. A method of configuring first and second wireless communication devices for wireless communication within first and second overlapping frequency ranges, respectively, the method comprising;
    (a) determining a first interference value that would occur if both the first and second overlapping frequency ranges were substantially identical;
    (b) determining a second interference value that would occur if the first overlapping frequency range differed from second overlapping frequency range by a specified amount;
    (c) determining whether an overall interference value based at least in part upon the first and second interference values satisfies a threshold criterion; and
    (d) if the threshold criterion is met, then configuring at least one of the first and second wireless communication devices so that the first and second overlapping frequency ranges of the first and second wireless communication devices differ by substantially the specified amount,
    wherein if a threshold criterion is not met, then varying the specified amount and repeating (b), (c) and (d)
    wherein the second interference value is a function of an overlap between a transmitter's signal power distribution across the frequency spectrum and a corresponding frequency response of receiver's band-pass filter, each associated with different of the first and second wireless communication devices.

2. The method of claim 1, wherein the specified amount is increased every time (b) is repeated.

3. The method of claim 1, wherein the first and second overlapping frequency ranges are selected from a plurality of channels, and the specified amount is a difference between center frequencies of two of the channels.

4. The method of claim 3, wherein the first and second wireless communication devices are configured for operation in accordance at least one protocol selected from the 802.11 family of protocols.

5. The method of claim 4, wherein the first and second wireless communication devices are configured for operation in accordance with the 802.11(b) protocol.

6. The method of claim 1, wherein the first interference value depends at least in part upon a physical proximity of the first wireless communication device in relation to the second wireless communication device.

7. The method of claim 1, wherein the first and second wireless communication devices are configured for operation in at least one of a WLAN, a mesh network, and a Wi-Fi application.

8. The method of claim 1, wherein each of the first and second wireless communication devices is selected from the group consisting of a portable computer, a desktop computer, a personal digital assistant, a handheld device, and a cellular telephone.

9. The method of claim 1, wherein the second interference value is indicative of an intersection between a transmitted signal characteristic of the first wireless communication device and a receiver filter characteristic of the second wireless communication device.

10. The method of claim 9, wherein the transmitted signal characteristic is a transmit spectrum mask characteristic, and wherein the receiver filter characteristic is a receiver band-pass filter characteristic.

11. A method of configuring first and second wireless communication devices for wireless communication within first and second overlapping frequency ranges, respectively, the method comprising;
    (a) determining a first interference value that would occur if both the first and second overlapping frequency ranges were substantially identical;
    (b) determining a second interference value that would occur if the first overlapping frequency range differed from second overlapping frequency range by a specified amount;
    (c) determining whether an overall interference value based at least in part upon the first and second interference values satisfies a threshold criterion; and
    (d) if the threshold criterion is met, then configuring at least one of the first and second wireless communication devices so that the first and second overlapping frequency ranges of the first and second wireless communication devices differ by substantially the specified amount, wherein if a threshold criterion is not met, then varying the specified amount and repeating (b), (c) and (d)
wherein the second interference value is an interference factor value representable by $IF_{(T,R)}(\tau)$, and wherein $$IF_{(T,R)}(\tau) = \int_{-\infty}^{+\infty} S_T(F) B_R(F-\tau) df.$$

12. A wireless communication device configured in accordance with the method of claim 1.

13. A further method of operating first and second pairs of wireless communication devices, the further method comprising the method of configuring of claim 1 and additionally comprising:
transmitting first communication signals within the first overlapping frequency range between the wireless communication devices of the first pair, wherein the wireless communication devices of the first pair include the first wireless communication device and a third wireless communication device; and
transmitting second communication signals within the second overlapping frequency range between the wireless communication devices of the second pair, the wireless communication devices of the second pair including a second wireless communication device and a fourth wireless communication device, the second overlapping frequency range substantially overlapping but not identical to the first overlapping frequency range;
wherein interaction of the first and second communication signals produces interference, and wherein an amount related to the interference is less than a threshold,
whereby the wireless communication devices of the first pair are able to communicate with one another and the wireless communication devices of the second pair are able to communicate with one another in a manner that is substantially unimpeded by the interference
including the step of selecting the first and second frequency range according to a determination of the interference by evaluating a function of an overlap between a transmitter signal's power distribution across the frequency spectrum for the first communication signals and a frequency response of a receiver's band-pass filter each for the second communications signals.

14. The method of claim 13, wherein the interference is determined from an interference factor value representable by $IF_{(T,R)}(\tau)$, and wherein $$IF_{(T,R)}(\tau) = \int_{-\infty}^{+\infty} S_T(F) B_R(F-\tau) df.$$

* * * * *